(12) United States Patent
Paielli (10) Patent No.: US 10,473,015 B2
(45) Date of Patent: Nov. 12, 2019

(54) PRESSURE SENSING SYSTEMS AND METHODS

(71) Applicant: Tenneco Automotive Operating Company Inc., Lake Forest, IL (US)

(72) Inventor: Perry Paielli, Commerce Township, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 211 days.

(21) Appl. No.: 15/727,976

(22) Filed: Oct. 9, 2017

(65) Prior Publication Data

US 2019/0107023 A1    Apr. 11, 2019

(51) Int. Cl.
| | |
|---|---|
| *F01N 3/20* | (2006.01) |
| *G01M 15/10* | (2006.01) |
| *G01L 9/00* | (2006.01) |
| *F02D 41/02* | (2006.01) |
| *F01N 3/035* | (2006.01) |
| *F02D 41/14* | (2006.01) |
| *F02D 41/28* | (2006.01) |

(52) U.S. Cl.
CPC ......... *F01N 3/208* (2013.01); *F02D 41/0235* (2013.01); *G01L 9/0051* (2013.01); *G01M 15/106* (2013.01); *F01N 3/035* (2013.01); *F01N 2560/08* (2013.01); *F01N 2900/1808* (2013.01); *F02D 41/1448* (2013.01); *F02D 2041/281* (2013.01)

(58) Field of Classification Search
CPC ................. F01N 3/208; F01N 2560/08; F01N 2900/1808; F01N 3/035; F02D 41/0235; F02D 2041/281; F02D 41/1448; G01M 15/106; G01L 9/0051
See application file for complete search history.

(56) References Cited

U.S. PATENT DOCUMENTS 7,049,883 B2    5/2006   Makino et al.
7,085,657 B2    8/2006   Drossel

FOREIGN PATENT DOCUMENTS

EP        1457767 A1    9/2004

*Primary Examiner* — Xiao En Mo
(74) *Attorney, Agent, or Firm* — Harness, Dickey & Pierce, P.L.C.

(57) ABSTRACT

A pressure sensor includes: a housing; a substrate that is fixed within the housing, that includes a first side that is in contact with a fluid of an exhaust aftertreatment system, and that flexes based on a pressure of the fluid; a first voltage divider that is connected between a first reference potential and a ground potential and that varies a first potential based on flexing of the substrate; and a second voltage divider connected in parallel with the first voltage divider between the first reference potential and the ground potential and that varies a second potential based on flexing of the substrate. A pressure control module is configured to selectively switch switches to connect and disconnect different reference potentials to and from an amplifier, to sample an output of the amplifier, and to convert samples of the output of the amplifier into corresponding digital values.

20 Claims, 8 Drawing Sheets

PRESSURE SENSING SYSTEMS AND METHODS

FIELD

The present disclosure relates to exhaust aftertreatment for an internal combustion engine and, more particularly, to pressure sensing systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To reduce the quantity of undesirable particulate matter and nitrogen oxide (NOx) emitted to the atmosphere during internal combustion engine operation, a number of exhaust aftertreatment systems have been developed. A need for exhaust aftertreatment systems particularly may arise when diesel combustion processes are implemented.

One method used to reduce NOx emissions from internal combustion engines is known as selective catalytic reduction (SCR). SCR may include injecting a reagent into the exhaust stream of the engine to form a reagent and exhaust gas mixture that is subsequently passed through a reactor containing a catalyst. The catalyst is capable of reducing the NOx concentration in the presence of the reagent. For example only, the catalyst may include activated carbon or metals, such as platinum, vanadium, or tungsten. An aqueous urea solution is known to be an effective reagent in SCR systems for diesel engines.

Various pressure sensors are implemented in exhaust aftertreatment systems. Examples of pressure sensors include exhaust pressure sensors, reagent pressure sensors, and other types of pressure sensors. Pressure sensors are connected to a controller that is separate from the pressure sensors via respective sets of wires. Each pressure sensor includes a sensing element that generates an analog signal corresponding to a sensed pressure. The pressure sensors output their analog signals to the controller via the respective sets of wires. Pressure sensors may also include additional signal conditioning circuitry that conditions the analog signals before the analog signals are output. The controller generates digital values based on the analog signals.

This pressure sensing system, however, is costly. A need exists to provide a lower cost solution for measuring and responding to pressures.

SUMMARY

In a feature, a pressure sensing system of an exhaust aftertreatment system of a vehicle is described. A pressure sensor includes: a housing; a substrate that is fixed within the housing, that includes a first side that is in contact with a fluid of the exhaust aftertreatment system, and that flexes based on a pressure of the fluid at the first side; a first voltage divider that is connected between a first reference potential and a ground potential and that varies a first potential based on flexing of the substrate; and a second voltage divider connected in parallel with the first voltage divider between the first reference potential and the ground potential and that varies a second potential based on flexing of the substrate. A pressure control module includes a measure circuit and a control module. The measure circuit includes: third, fourth, and fifth voltage dividers that are connected between the first reference potential and the ground potential and that output third, fourth, and fifth potentials, respectively; a first switch connected to selectively connect and disconnect the first potential to and from a first end of a capacitor; a second switch connected to selectively connect and disconnect the second potential to and from a second end of the capacitor; a third switch connected to selectively connect and disconnect the third potential to and from the first end of the capacitor; a fourth switch connected to selectively connect and disconnect the fourth potential to and from the first end of the capacitor; a fifth switch connected to selectively connect and disconnect the fifth potential to and from the second end of the capacitor; the capacitor; a sixth switch connected to selectively connect and disconnect the first end of the capacitor to an input of an amplifier; the amplifier; and a seventh switch connected to selectively connect and disconnect the second end of the ground potential; and a control module that is configured to: selectively switch the first, second, third, fourth, fifth, sixth, and seventh switches; sample an output of the amplifier; and convert samples of the output of the amplifier into corresponding digital values.

In further features, resistances of at least one of first and second resistors of the first voltage divider vary based on flexing of the substrate; and resistances of at least one of third and fourth resistors of the second voltage divider vary based on flexing of the substrate.

In further features: the first voltage divider increases the first potential as flexing of the substrate increases; and the second voltage divider decreases the second potential as flexing of the substrate increases.

In further features: the first voltage divider increases the first potential as flexing of the substrate increases; and the second voltage divider increases the second potential as flexing of the substrate increases.

In further features, the first voltage divider includes: a first resistor having a first resistance; and a second resistor having a second resistance. The second voltage divider includes: a third resistor having a third resistance; and a fourth resistor having a fourth resistance.

In further features, the first resistance is equal to the second resistance and the third resistance is equal to the fourth resistance.

In further features, the second resistance is equal to the third resistance.

In further features, resistors of the first, second, third, fourth, and fifth voltage dividers have temperature coefficients of 50 ppm/degree Celsius or better.

In further features, resistors of the first, second, third, fourth, and fifth voltage dividers have tolerances of 0.1% or better.

In further features, the amplifier includes a slew rate of at least 2V/microsecond.

In further features, the control module is configured to: at a first time: close the first and second switches thereby connecting the first and second potentials with the first and second ends of the capacitor; and open the third, fourth, fifth, sixth, and seventh switches; at a second time that is after the first time: close the sixth and seventh switches thereby connecting the capacitor with the input of the amplifier; and open the first, second, third, fourth, and fifth switches.

In further features, the control module is further configured to: at a third time: close the third and fifth switches thereby connecting the third and fifth potentials with the first and second ends of the capacitor; and open the first, second, fourth, sixth, and seventh switches; at a fourth time that is after the third time: close the sixth and seventh switches thereby connecting the capacitor with the input of the amplifier; and open the first, second, third, fourth, and fifth switches.

In further features, the control module is further configured to: at a fifth time: close the fourth and fifth switches thereby connecting the fourth and fifth potentials with the first and second ends of the capacitor; and open the first, second, third, sixth, and seventh switches; at a sixth time that is after the fifth time: close the sixth and seventh switches thereby connecting the capacitor with the input of the amplifier; and open the first, second, third, fourth, and fifth switches.

In further features, the control module is further configured to: while the sixth and seventh switches are closed after the second time, sample the output of the amplifier to produce a first sample value; while the sixth and seventh switches are closed after the fourth time, sample the output of the amplifier to produce a second sample value; while the sixth and seventh switches are closed after the sixth time, sample the output of the amplifier to produce a third sample value; convert the first, second, and third sample values into first, second, and third digital values, respectively, using analog to digital (A/D) conversion; determine correction values based on the second and third digital values; determine a corrected digital value based on the first digital value and the correction values; and determine a pressure based on the corrected digital value.

In further features, the control module is configured to determine the pressure based on the corrected digital value and a predetermined value.

In further features, the control module is configured to set the pressure based on the corrected digital value multiplied by the predetermined value.

In further features, the control module is further configured to, based on the pressure, selectively adjust a speed of a pump that pumps the fluid.

In a feature, a pressure sensing system of an exhaust aftertreatment system of vehicle includes a pressure sensor and a pressure control module. The pressure sensor includes: a housing; a substrate that is fixed within the housing, that includes a first side that is in contact with a fluid of the exhaust aftertreatment system, and that flexes based on a pressure of the fluid at the first side; and a sense circuit that is implemented one of on and within the substrate and that includes: a first resistor and a second resistor that: are connected in series between a first reference potential and a ground potential; and vary a first potential at a first node between the first resistor and the second resistor based on flexing of the substrate; a third resistor and a fourth resistor that: are connected in series between the first reference potential and the ground potential in parallel with the first and second resistors; and vary a second potential at a second node between the third resistor and the fourth resistor based on flexing of the substrate. The pressure control module includes: a measure circuit that includes: a fifth resistor, a sixth resistor, a seventh resistor, and an eighth resistors that are connected in series between the first reference potential and the ground potential and that: output a third potential at a third node between the fifth resistor and the sixth resistor; output a fourth potential at a fourth node between the sixth resistor and the seventh resistor; and output a fifth potential at a fifth node between the seventh resistor and the eighth resistor; a first switch connected to selectively connect and disconnect the first potential to and from a first end of a capacitor; a second switch connected to selectively connect and disconnect the second potential to and from a second end of the capacitor; a third switch connected to selectively connect and disconnect the third potential to and from the first end of the capacitor; a fourth switch connected to selectively connect and disconnect the fourth potential to and from the first end of the capacitor; a fifth switch connected to selectively connect and disconnect the fifth potential to and from the second end of the capacitor; the capacitor; a sixth switch connected to selectively connect and disconnect the first end of the capacitor to an input of an amplifier; the amplifier; and a seventh switch connected to selectively connect and disconnect the second end of the ground potential; and a control module that is configured to: selectively switch the first switch, the second switch, the third switch, the fourth switch, the fifth switch, the sixth switch, and the seventh switch; sample an output of the amplifier; and convert samples of the output of the amplifier into corresponding digital values.

In further features, the control module is configured to: at a first time: close the first and second switches thereby connecting the first and second potentials with the first and second ends of the capacitor; and open the third, fourth, fifth, sixth, and seventh switches; at a second time that is after the first time: close the sixth and seventh switches thereby connecting the capacitor with the input of the amplifier; and open the first, second, third, fourth, and fifth switches; at a third time: close the third and fifth switches thereby connecting the third and fifth potentials with the first and second ends of the capacitor; and open the first, second, fourth, sixth, and seventh switches; at a fourth time that is after the third time: close the sixth and seventh switches thereby connecting the capacitor with the input of the amplifier; and open the first, second, third, fourth, and fifth switches; at a fifth time: close the fourth and fifth switches thereby connecting the fourth and fifth potentials with the first and second ends of the capacitor; and open the first, second, third, sixth, and seventh switches; at a sixth time that is after the fifth time: close the sixth and seventh switches thereby connecting the capacitor with the input of the amplifier; and open the first, second, third, fourth, and fifth switches; while the sixth and seventh switches are closed after the second time, sample the output of the amplifier to produce a first sample value; while the sixth and seventh switches are closed after the fourth time, sample the output of the amplifier to produce a second sample value; while the sixth and seventh switches are closed after the sixth time, sample the output of the amplifier to produce a third sample value; convert the first, second, and third sample values into first, second, and third digital values using analog to digital (A/D) conversion; determine correction values based on the second and third digital values; determine a corrected digital value based on the first digital value and the correction values; and determine a pressure based on the corrected digital value.

In further features, the control module is further configured to, based on the pressure, selectively adjust a speed of a pump that pumps the fluid.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A pressure sensing system of an exhaust aftertreatment system could include a pressure sensor and a control module that is separate from the pressure sensor and connected to the pressure sensor via a wiring harness. The pressure sensor measures a pressure of a fluid (e.g., exhaust gas, liquid reagent, etc.). The pressure sensor may include a substrate (e.g., a circuit board) that includes one or more electrical components (e.g., resistors) that vary outputs based on pressure applied to the substrate. The pressure sensor may also include a differential amplifier that generates an (analog) output via the wiring harness based on the outputs of the electrical components. The control module samples and digitizes the analog output to determine the pressure of the fluid. Such pressure sensing systems, however, are costly.

According to the present disclosure, a pressure sensor includes a sense circuit, and a pressure control module includes a measurement circuit and a control module. The sense circuit of the pressure sensor includes electrical components (e.g., a resistor bridge) that vary outputs based on pressure.

The measure circuit includes a capacitor, an amplifier, and a plurality of switches. The control module controls switching of the switches to connect the sense circuit to the capacitor at some times and to connect other reference potentials to the capacitor at other times. The control module also controls switching of the switches to connect the capacitor to the amplifier at different times to input, to the amplifier, different potentials (e.g., from the sense circuit, the other reference potentials) that the capacitor has been charged to. The control module samples the output of the amplifier and digitizes the resulting sample. This system is less costly than comparable pressure sensing systems, such as those described above.

Based on some of the digital values determined based on the input of the amplifier being connected to known/fixed reference potentials, the control module can determine correction values and adjust (correct) digital values determined for samples when the input of the amplifier is receiving the output of the sense circuit. The ability to self-adjust/correct increases precision of the pressure sensing system of the present disclosure.

Figure 1:
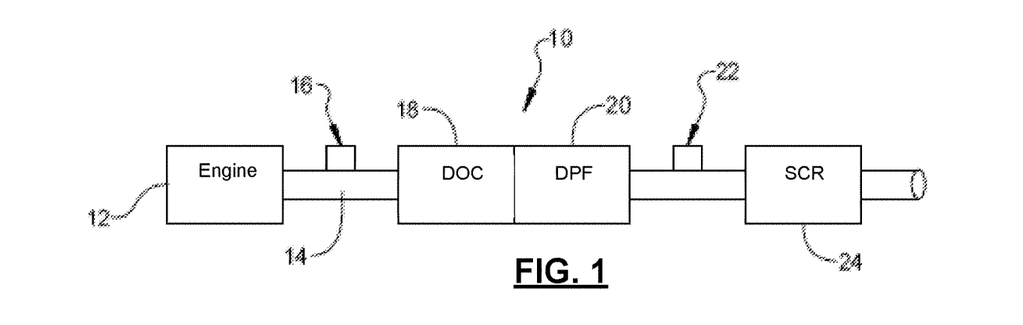
FIG. 1 includes a functional block diagram of an example exhaust gas aftertreatment system.

FIG. 1 includes a functional block diagram of an exhaust gas aftertreatment system 10 for treating the exhaust output from a diesel internal combustion engine 12 in an exhaust (gas) passageway 14. The exhaust gas aftertreatment system 10 may include a first fluid delivery system 16, a diesel oxidation catalyst (DOC) 18, a diesel particulate filter (DPF) 20, a second fluid delivery system 22, and a selective catalytic reduction (SCR) catalyst 24. While FIG. 1 depicts only the engine 12 discharging exhaust gas into the exhaust passageway 14, in some embodiments, a plurality of internal combustion engines may discharge exhaust gas into the exhaust passageway 14 so that the exhaust gas aftertreatment system 10 collectively treats exhaust gas from multiple internal combustion engines. Multiple internal combustion engines may operate concurrently and/or independently of each other.

Figure 2:
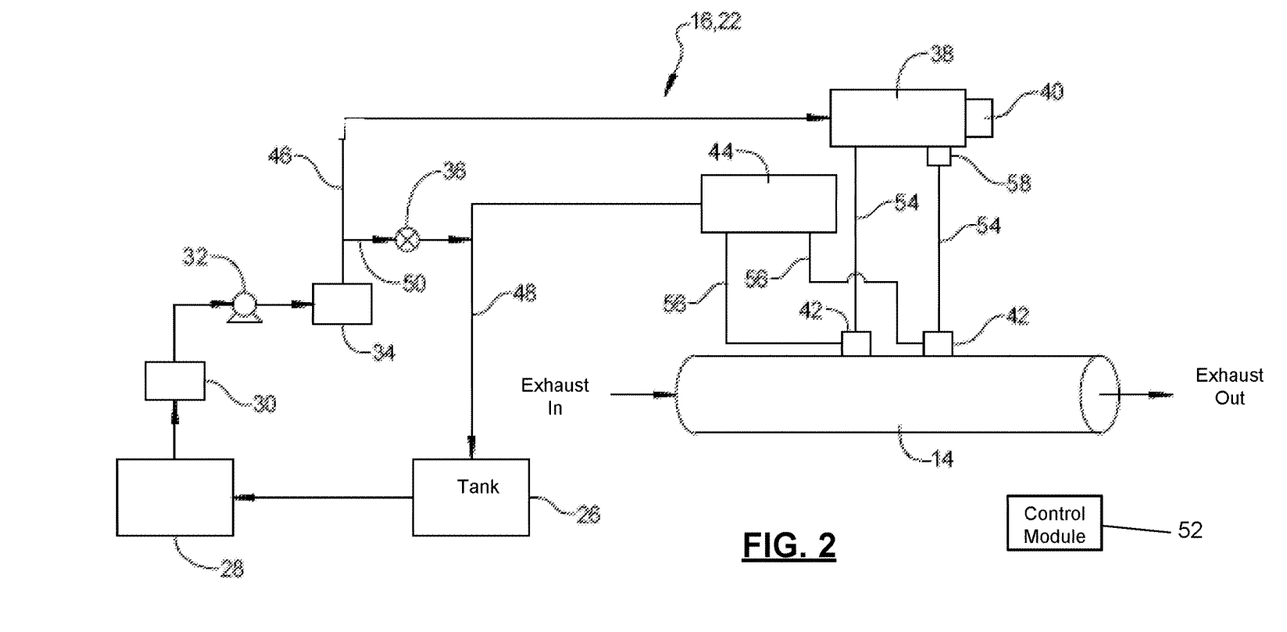
FIG. 2 includes a functional block diagram of an example fuel delivery system.

The first fluid delivery system 16 may spray diesel fuel (or another type of hydrocarbon or fuel) into the exhaust stream at or upstream of the DOC 18. The second fluid delivery system 22 may spray urea (or another type of reagent) into the exhaust stream at or upstream of the SCR catalyst 24. While an example orientation of components is provided in FIG. 1, the positioning of one or more components of the exhaust gas aftertreatment system 10 may be different than the positioning shown in the example of FIG. 1. The present disclosure is also applicable to exhaust gas aftertreatment systems having components positioned differently.

FIG. 2 includes a functional block diagram of an example fuel delivery system. Either or both of the first and second fluid delivery systems 16, 22 may be configured as shown in FIG. 2. The following description of the example fluid delivery system of FIG. 2 may apply equally to the first and second fluid delivery systems 16, 22.

As shown in FIG. 2, the fluid delivery system may include a tank 26, a filter 28, a temperature sensor 30, a pump 32, a first pressure sensor 34, a bypass valve 36, one or more supply manifolds 38, a second pressure sensor 40, one or more injectors 42 and one or more return manifolds 44. The tank 26 stores fluid, such as the reagent. The pump 32 draws the fluid from the tank 26 and pumps the fluid to a supply passageway 46. The fluid flows into the tank 26 from a return passageway 48. The tank 26 may also include one or more other passes for inputting the fluid to the tank 26, such as fluid input by a user. A bypass passageway 50 may directly fluidly connect the supply passageway 46 with the return passageway 48.

The fluid delivery system of FIG. 2 is illustrated as including two injectors 42. However, the fuel delivery system may include a different number of injectors including one injector or more than two injectors. The fluid delivery system could include one or more injectors 42 that inject fluid into separate exhaust passageways 14 that correspond to different engines.

The pump 32 may draw the fluid from the tank 26 through the filter 28. The temperature sensor 30 may measure a temperature of the fluid flowing from the tank 26, generate a temperature signal corresponding to the temperature, and output the temperature signal to a control module 52. The first pressure sensor 34 measures a first pressure of the fluid in the supply passageway 46. The first pressure sensor 34 generates a first pressure signal corresponding to the first pressure and outputs the first pressure signal to the control module 52.

Some or all of the fluid from the supply passageway 46 may flow into the supply manifold 38. The second pressure sensor 40 measures a second pressure of the fluid in the supply manifold 38. The second pressure sensor 40 generates a second pressure signal corresponding to the second pressure, and outputs the second pressure signal to the control module 52.

The injectors 42 may receive the fluid from the supply manifold 38 via supply lines 54. In various implementations, one or more urea quality sensors, such as urea quality sensor 58, may be disposed along one or more supply lines 54. The urea quality sensor 58 may measure a concentration of a component of the reagent (e.g., a concentration of ammonia in urea) that is being supplied to the injectors 42. The urea quality sensor 58 may generate a quality signal corresponding to the concentration and output the quality signal to the control module 52. In various implementations, the exhaust aftertreatment system may include one or more other sensors.

The injectors 42 inject a first portion of the fluid flowing through the supply lines 54 into the exhaust passageway 14 and, therefore, the exhaust stream flowing through the exhaust passageway 14. A second (remaining) portion of the fluid at the injectors 42 flows to the return manifold 44 through return lines 56. The fluid flows from the return manifold 44 back to the tank 26 via the return passageway 48.

The control module 52 controls actuation of the bypass valve 36 and the injectors 42 based on the signals from the sensors including the temperature signal, the first and second pressure signals, the quality signal, and the signals from other sensors. The control module 52 (or another control module, as discussed further below) controls the pump 32. For example, the control module 52 may control opening of the injectors 42 to control the amount of fluid that is injected into the exhaust stream based on the temperature signal, the first and second pressure signals, the quality signal, and the signals from other sensors. For example, the control module 52 may determine characteristics of pulse width modulation (PWM) signals to apply to the injectors 42 to achieve a target flow rate of reagent into the exhaust passageway 14. Examples of characteristics include, for example, ON period, ON time, OFF time, etc.

The control module 52 may control an opening of the bypass valve 36. The bypass valve 36 being open allows a portion of the fluid in the supply passageway 46 to flow directly to the return passageway 48 through the bypass passageway 50. The portion increases as the opening of the bypass valve 36 increases and vice versa.

The control module 52 may control operation and speed the pump 32 and/or opening of the bypass valve 36, for example, based on a target flow rate or one or more target pressures, such as a first target pressure at the first pressure sensor 34 and/or a second target pressure at the second pressure sensor 40. For example, the control module 52 may actuate the bypass valve 36 to adjust the first pressure measured by the first pressure sensor 34 toward or to a first target pressure in the supply passageway 46 and to adjust the second pressure measured by the second pressure sensor 40 toward or to a second target pressure at one or more of the injectors 42. The first target pressure may be greater than the second target pressure. The first target pressure and the second target pressure may be a fixed value or may be variable. In the example of variables, the control module 52 may determine the first target pressure and/or the second target pressure based on one or more operating parameters, such as (e.g., engine speed, engine load, engine temperature, exhaust gas temperature, and/or exhaust gas flow rate).

For example, when the first pressure is less than the first target pressure and/or the second pressure is less than the second target pressure, the control module 52 may decrease the opening of the bypass valve 36 or close the bypass valve 36. Conversely, when the first pressure is greater than the first target pressure and/or the second pressure is greater than the second target pressure, the control module 52 may increase the opening of the bypass valve 36.

Figure 3:
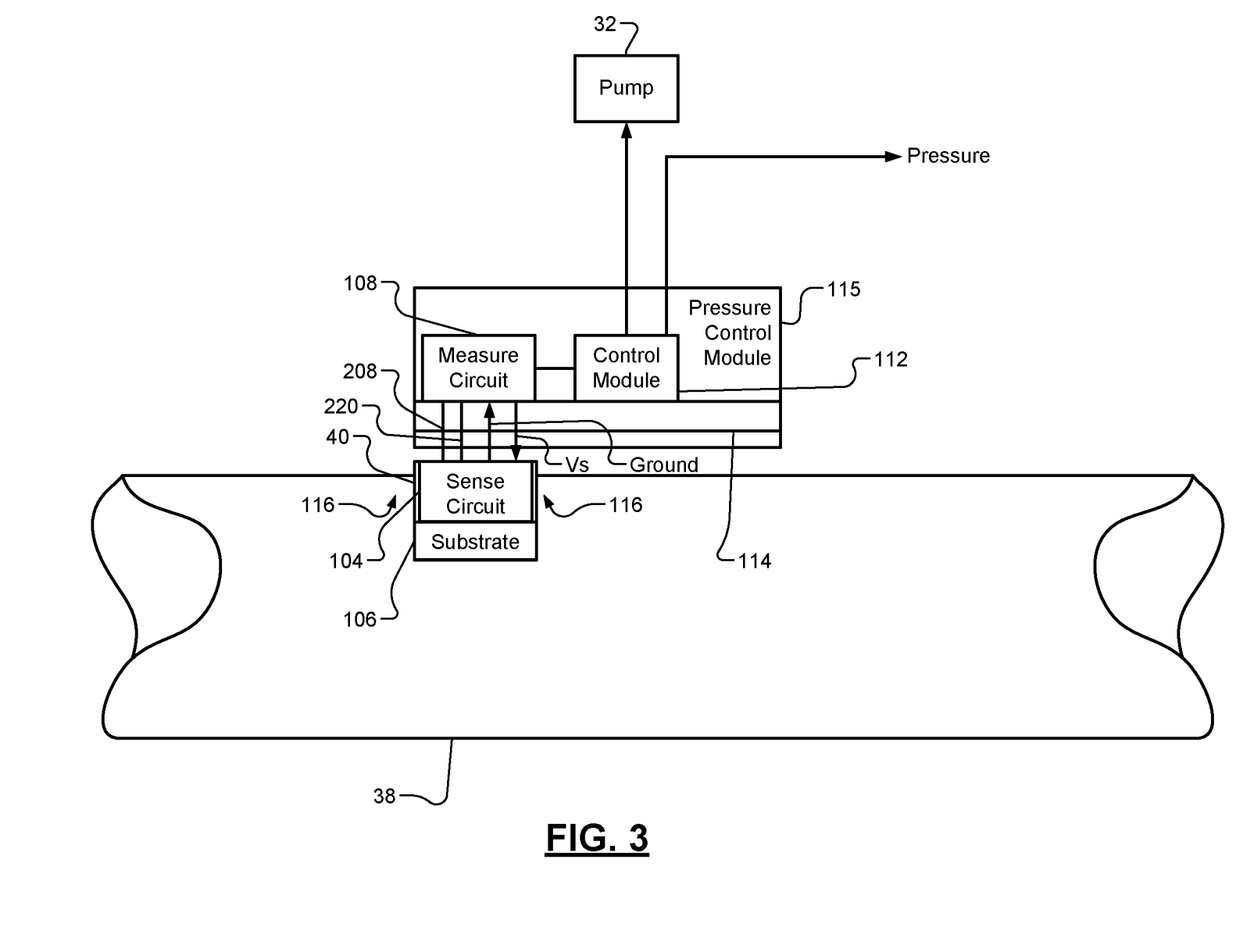
FIG. 3 includes a functional block diagram of an example pressure sensing system.

FIG. 3 is a functional block diagram of an example implementation of a pressure sensing system including the second pressure sensor 40 and a pressure control module 115. While the following will be described in conjunction with the example of the second pressure sensor 40, the following is also applicable to the first pressure sensor 34, pressure sensors located in different locations in an exhaust aftertreatment system, and pressure sensors in other types of systems.

The second pressure sensor 40 includes a sense circuit 104 implemented on or within a substrate 106. The substrate 106 is fixed within a housing of the second pressure sensor 40. Via an opening 116 in the supply manifold 38, a first (fluid facing) surface of the substrate 106 is exposed to pressure within the supply manifold 38. A gasket or another type of sealing member may seal gaps between inner edges of the opening 116 and the second pressure sensor 40. A gasket or another type of sealing member may seal gaps between inner walls of the housing of the second pressure sensor 40 and the substrate 106.

Pressure of the fluid within the supply manifold 38 causes the substrate 106 to flex away from the fluid. More specifically, the substrate 106 flexes (deflects) based on a pressure difference between a pressure on the first side of the substrate 106 and a pressure on a second side of the substrate 106 that is opposite the first face. In various implementations, the housing of the second pressure sensor 40 may be vented such that the pressure on the second side of the substrate 106 is connected to atmosphere. The flexing of the substrate 106 caused by the fluid pressure causes one or more characteristics (e.g., resistance) of one or more components of the sense circuit 104 to vary. An output (e.g., voltage) of the sense circuit 104 varies as the one or more characteristics vary.

The pressure control module 115 includes a measure circuit 108 and a control module 112 implemented on a circuit board 114, such as a printed circuit board (PCB). The sense circuit 104 of the second pressure sensor 40, the measure circuit 108, and the control module 112 are electrically connected, as described further below.

The control module 112 controls connection of the measurement circuit 108 to the output of the sense circuit 104 at some times and to two or more references (e.g., voltages) at other times. The control module 112 converts the (analog) output of the measure circuit 108 into corresponding digital values. The control module 112 determines correction values based on the digital values corresponding to the references. Using the correction values, the control module 112 corrects digital values determined based on outputs of the sense circuit 104. The control module 112 converts the corrected digital values into pressures at the second pressure sensor 40. The control module 112 may output the pressures, such as to the control module 52, via one or more electrical conductors, such as wires.

In various implementations, the control module 112 may control the pump 32 in closed loop to adjust the pressure toward the second target pressure.

Figure 4:
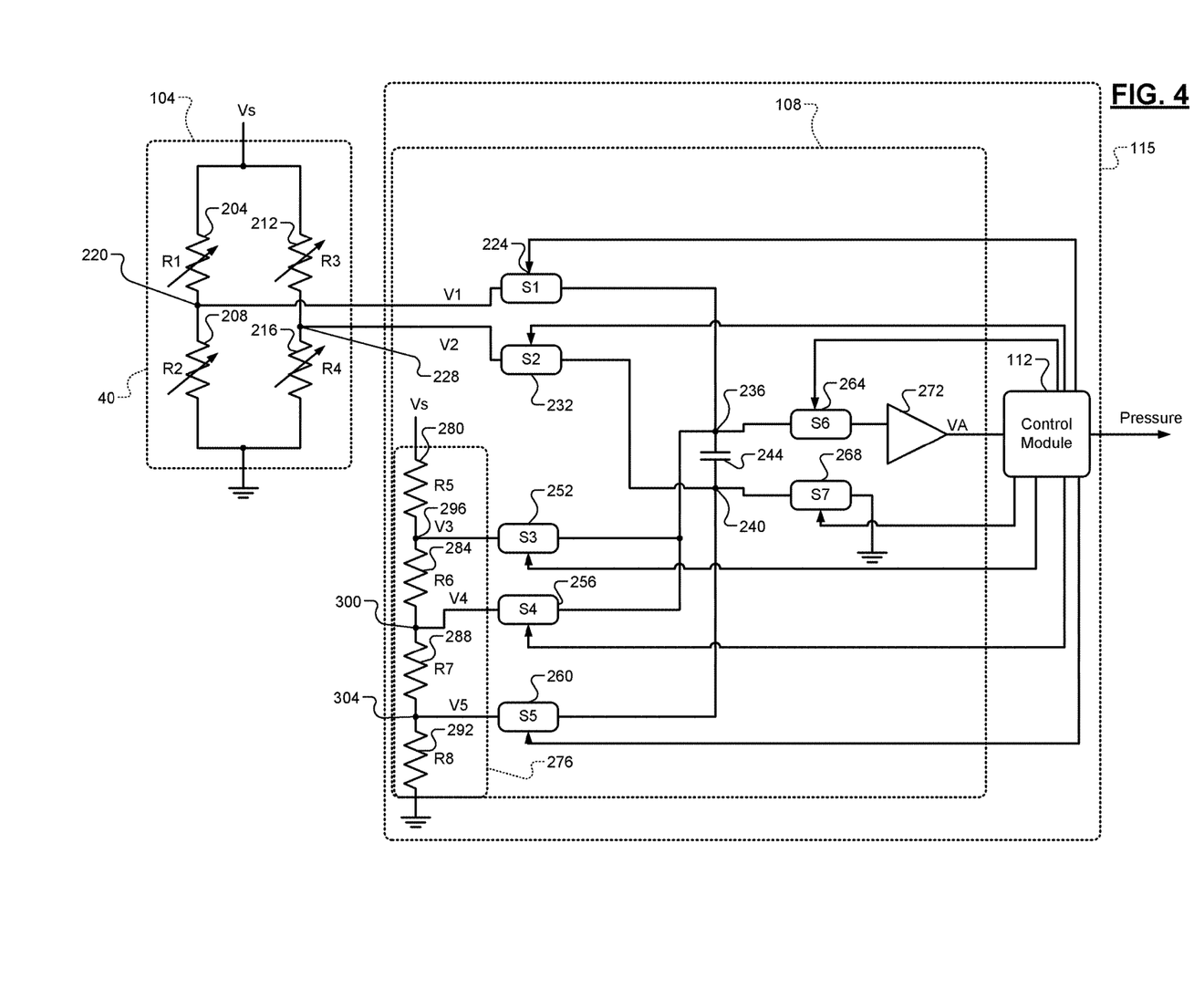
FIG. 4 is a schematic including an example implementation of a pressure sensor and a pressure control module.

FIG. 4 is a schematic including an example implementation of the sense circuit 104 of the second pressure sensor 40 and the measure circuit 108 and the control module 112 of the pressure control module 115. An example of the sense circuit 104 of the second pressure sensor 40 includes a resistor bridge including a first resistor 204, a second resistor 208, a third resistor 212, and a fourth resistor 216. The first and second resistors 204 and 208 are connected in series between a reference potential (Vs) and a ground potential.

For example only, the reference potential may be 5 Volts or another suitable direct current (DC) voltage.

The first and second resistors 204 and 208 form a first voltage divider. A node 220 between the first and second resistors 204 and 208 is connected to a first terminal of a first switch 224. The third and fourth resistors 212 and 216 are also connected in series between the reference potential (Vs) and the ground potential. The third and fourth resistors 212 and 216 are connected in parallel with the first and second resistors 204 and 208. The third and fourth resistors 212 and 216 form a second voltage divider. A node 228 between the third and fourth resistors 212 and 216 is connected to a first terminal of a second switch 232.

The first, second, third, and fourth resistors 204, 208, 212, and 216 may be, for example, thin film resistors that are printed or otherwise patterned onto or into the substrate 106. However, the first, second, third, and fourth resistors 204, 208, 212, and 216 may be another suitable type of resistor. In various implementations, the first, second, third, and fourth resistors 204, 208, 212, and 216 have temperature coefficients of 50 ppm/degree Celsius or better and tolerances of 0.1% or better. The first and second switches 224 and 232 are automotive grade solid-state (semiconductor) switches, such as 4066 type (quad bilateral) switches or another suitable type of switch.

The first, second, third, and fourth resistors 204, 208, 212, and 216 (i.e., their resistances) may be configured such that reference potentials (V1 and V2) at the nodes 220 and 228 are both approximately one-half of the reference potential (Vs) when no pressure is applied to the substrate 106. While the example of one-half is provided, another suitable fraction of the reference potential may be used. Also, while the example of the first, second, third, and fourth resistors 204, 208, 212, and 216 being configured to provide the same potential at the nodes 220 and 228 is provided, the first, second, third, and fourth resistors 204, 208, 212, and 216 may be configured to provide different potentials at the nodes 220 and 228.

The resistances of the first, second, third, and fourth resistors 204, 208, 212, and 216 vary as pressure within the supply manifold 38 causes the substrate 106 to flex. In various implementations, the first, second, third, and fourth resistors 204, 208, 212, and 216 may be configured such that the potential at the node 220 increases as pressure increases (and vice versa) and the potential at the node 228 decreases as the pressure increases (and vice versa). In this example, because the first and second resistors 204 and 208 form a first voltage divider, the resistance of the second resistor 208 may increase and/or the resistance of the first resistor 204 may increase as pressure increases (and vice versa). Because the third and fourth resistors 212 and 216 form a second voltage divider, the resistance of the fourth resistor 216 may decrease and/or the resistance of the third resistor 212 may increase as pressure increases (and vice versa).

While the example of the first, second, third, and fourth resistors 204, 208, 212, and 216 being configured such that the potential at the node 220 increases as pressure increases (and vice versa) and the potential at the node 228 decreases as the pressure increases (and vice versa), the first, second, third, and fourth resistors 204, 208, 212, and 216 may be configured such that the potentials at the nodes 220 and 228 both increase as the pressure increases (and vice versa) or such that the potentials at the nodes 220 and 228 both decrease as the pressure increases (and vice versa). Also, while the example of the sense circuit 104 including resistor based voltage dividers is provided, the sense circuit 104 may include another type of voltage divider, such as voltage dividers implemented from capacitors.

A second terminal of the first switch 224 is connected to a first measurement node 236, and a second terminal of the second switch 232 is connected to a second measurement node 240. A first terminal (e.g. anode) of a capacitor 244 is connected to the first measurement node 236, and a second terminal (e.g., cathode) of the capacitor 244 is connected to the second measurement node 240.

The measure circuit 108 includes the first and second switches 224 and 232 and the capacitor 244. The measure circuit 108 also includes third, fourth, fifth, sixth, and seventh switches 252, 256, 260, 264, and 268 and an amplifier 272. The measure circuit 108 also includes a reference circuit 276 that generates reference potentials. For example, the reference circuit 276 may include fifth, sixth, seventh, and eighth resistors 280, 284, 288, and 292 connected in series between the reference potential (Vs) and the ground potential to form third, fourth, and fifth voltage dividers.

A node 296 between the fifth and sixth resistors 280 and 284 is connected to a first terminal of the third switch 252. A third reference potential (V3) is present at the node 296. The fifth and sixth resistors 280 and 284 form a third voltage divider. A node 300 between the sixth and seventh resistors 284 and 288 is connected to a first terminal of the fourth switch 256. A fourth reference potential (V4) is present at the node 300. The sixth and seventh resistors 284 and 288 form a fourth voltage divider. A node 304 between the seventh and eighth resistors 288 and 292 is connected to a first terminal of the fifth switch 260. The seventh and eighth resistors 288 and 292 form a fifth voltage divider. A fifth reference potential (V5) is present at the node 304. The third reference potential (V3) is less than the reference potential (Vs), the fourth reference potential (V4) is less than the third reference potential (V3), and the fifth reference potential (V5) is less than the fourth reference potential (V4).

The fifth, sixth, seventh, and eighth resistors 280, 284, 288, and 292 may be, for example, thin film resistors that are printed or otherwise patterned onto or into the circuit board 114. However, the fifth, sixth, seventh, and eighth resistors 280, 284, 288, and 292 may be another suitable type of resistor. In various implementations, the fifth, sixth, seventh, and eighth resistors 280, 284, 288, and 292 have temperature coefficients of 50 ppm/degree Celsius or better and tolerances of 0.1% or better. The third, fourth, and fifth switches 252, 256, 260 are automotive grade solid-state (semiconductor) switches, such as 4066 type (quad bilateral) switches or another suitable type of switch.

The fifth, sixth, seventh, and eighth resistors 280, 284, 288, and 292 have fixed resistances. The fifth, sixth, seventh, and eighth resistors 280, 284, 288, and 292 may be configured to provide reference potentials at the nodes 296, 300, and 304 that are at least a predetermined amount greater than and less than the potentials at the nodes 220 and 228 when no pressure is applied to the substrate 106. While the example of the measure circuit 108 including resistor based voltage dividers is provided, the measure circuit 108 may include another type of voltage divider, such as voltage dividers implemented from capacitors.

Second terminals of the third and fourth switches 252 and 256 are connected to the first measurement node 236. A second terminal of the fifth switch 260 is connected to the second measurement node 240.

The amplifier 272 may be an automotive grade amplifier, such as an op amp. In various implementations, the amplifier 272 may have a slew rate of at least 2V/microsecond. In an example, the amplifier 272 may be a TVL271 amplifier by Texas Instruments, of Dallas, Tex.

The control module 112 controls switching of the first, second, third, fourth, and fifth switches 224, 232, 252, 256, and 260 to connect different reference potentials to the capacitor 244. This charges/discharges the capacitor 244. For example, at some times, the control module 112 closes the first and second switches 224 and 232 and opens the third, fourth, fifth, sixth, and seventh switches 252, 256, 260, 264, and 268 to connect the first and second reference potentials V1 and V2 to the capacitor 244. When the capacitor 244 is charged based on the first and second reference potentials V1 and V2, the control module 112 opens the first, second, third, fourth, and fifth, switches 224, 232, 252, 256, and 260 and closes the sixth and seventh switches 264 and 268. This connects the capacitor 244 with the input of the amplifier 272. The control module 112 can then sample the output of the amplifier 272 (which then corresponds to an amplified difference between the first and second reference potentials V1 and V2).

At other times, the control module 112 closes the third and fifth switches 252 and 260 and opens the first, second, fourth, sixth, and seventh switches 224, 232, 256, 264, and 268 to connect the third and fifth reference potentials V3 and V5 to the capacitor 244. When the capacitor 244 is charged based on the third and fifth reference potentials V3 and V5, the control module 112 opens the first, second, third, fourth, and fifth, switches 224, 232, 252, 256, and 260 and closes the sixth and seventh switches 264 and 268. This connects the capacitor 244 with the input of the amplifier 272. The control module 112 can then sample the output of the amplifier 272 (which then corresponds to an amplified difference between the third and fifth reference potentials V3 and V5) to determine a first (high) value.

At yet other times, the control module 112 closes the fourth and fifth switches 256 and 260 and opens the first, second, third, sixth, and seventh switches 224, 232, 252, 264, and 268 to connect the fourth and fifth reference potentials V4 and V5 to the capacitor 244. When the capacitor 244 is charged based on the fourth and fifth reference potentials V4 and V5, the control module 112 opens the first, second, third, fourth, and fifth, switches 224, 232, 252, 256, and 260 and closes the sixth and seventh switches 264 and 268. This connects the capacitor 244 with the input of the amplifier 272. The control module 112 can then sample the output of the amplifier 272 (which then corresponds to an amplified difference between the fourth and fifth reference potentials V4 and V5) to determine a second (low) value.

The control module 112 determines correction values based on the first and second values. The control module 112 determines pressure values based on the correction values and digital values corresponding to samples, respectively, of the output of the amplifier 272 (corresponding to an amplified difference between the first and second reference potentials V1 and V2).

Figure 5:
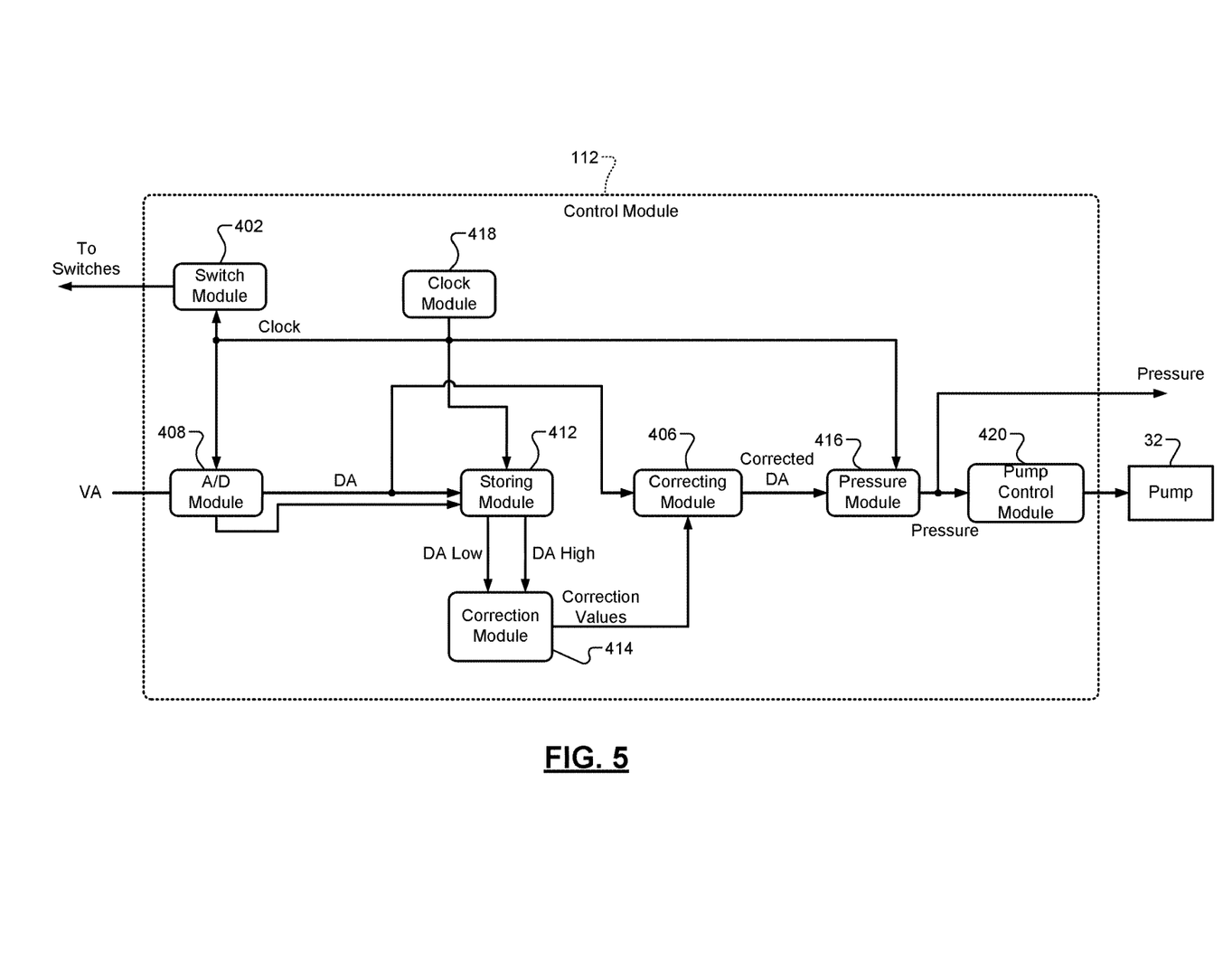
FIG. 5 is a functional block diagram of an example implementation of a control module.

FIG. 5 includes a functional block diagram of an example implementation of the control module 112. The control module 112 includes a switch module 402, a correcting module 406, an analog to digital (A/D) module 408, a storing module 412, a correction module 414, a pressure module 416, and a clock module 418. The clock module 418 generates a clock signal (clock) at a predetermined rate (i.e., every predetermined period).

The switch module 402 controls switching of the first, second, third, fourth, fifth, sixth, and seventh switches 224, 232, 252, 256, 260, 264, and 268. The A/D module 408 samples the (analog) output (VA) of the amplifier 272 based on the clock signal and converts the sample values into corresponding digital values (DA) using A/D conversion. This includes digital values (DA High) corresponding to the amplified difference between third and fifth reference potentials (V5–V3) output by the amplifier 272 (VA) when the input is receiving the difference between the third and fifth reference potentials V3 and V5, digital values (DA Low) corresponding to the amplified difference between fourth and fifth reference potentials (V4–V3) output by the amplifier 272 (VA) when the input is receiving the difference between the fourth and fifth reference potentials V4 and V5, and digital values (DA) corresponding to the output of the amplifier 272 when the input is receiving the difference between the first and second reference potentials V1 and V2.

The storing module 412 stores the digital value (DA High) determined based on the sample value of the output of the amplifier 272 (VA) when the input is receiving the difference between the third and fifth reference potentials V3 and V5. The storing module 412 also stores the digital value (DA Low) determined based on the sample value of the output of the amplifier 272 (VA) when the input is receiving the difference between the fourth and fifth reference potentials V4 and V5.

Based on the stored digital values, the correction module 414 determines correction values. Based on the correction values, the correcting module 406 corrects digital values (DA) corresponding to the output of the amplifier 272 when the input is receiving the difference between the first and second reference potentials V1 and V2.

Figure 6:
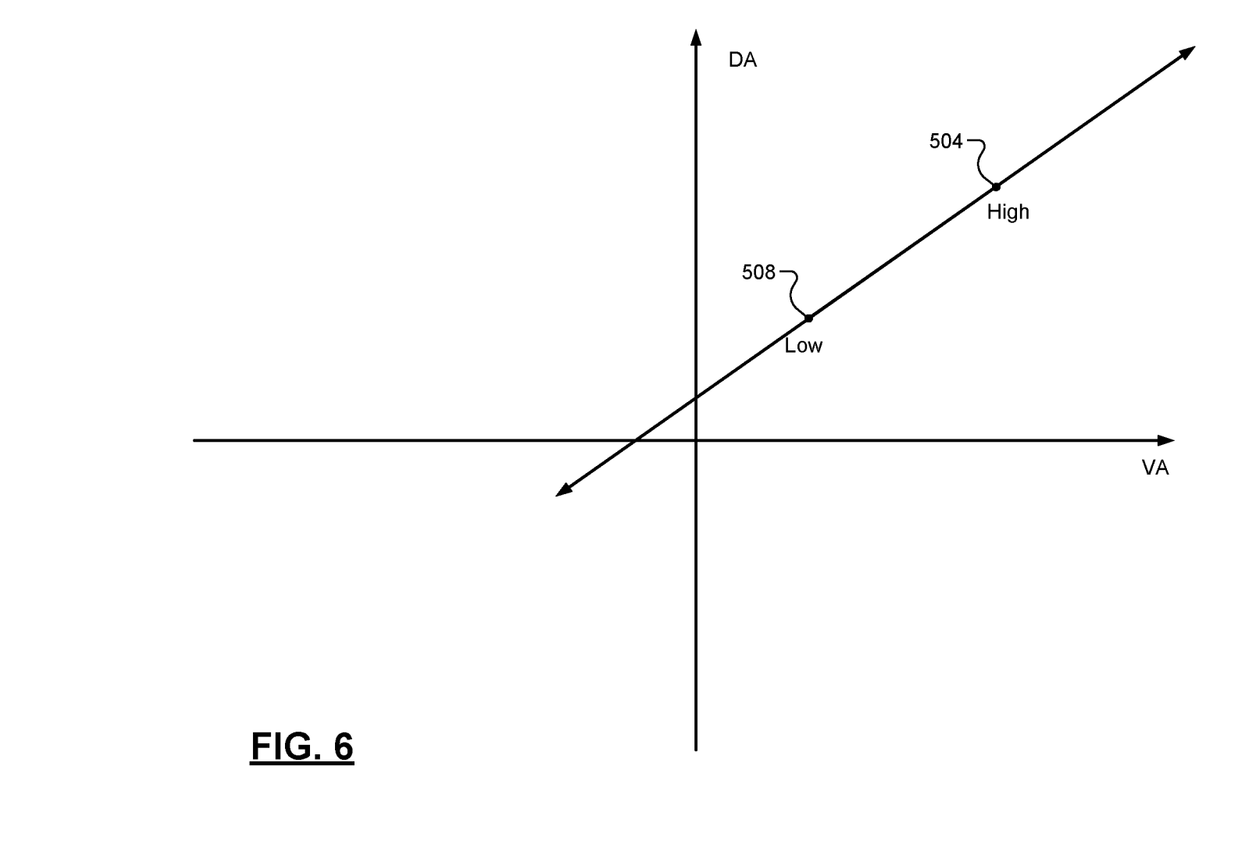
FIG. 6 is an example graph of digital values versus sample values.

FIG. 6 includes an example graph of digital values (DA) versus sample values of the output (VA) of the amplifier 272. Coordinates (X1, Y1) of first point 504 correspond to the digital value (DA) resulting from the sample of the output of the amplifier 272 (VA) corresponding to amplified differences between third and fifth reference potentials V5 and V3. Coordinates (X2, Y2) of second point 508 correspond to the digital value (DA) resulting from the sample of the output of the amplifier 272 (VA) corresponding to amplified differences between fourth and fifth reference potentials V5 and V4.

Equation 1 (eq 1) below describes the slope (m) of a line that is created by the digital values (DA High and DA Low) based on the respective reference voltages (VA High and VA Low). The reference voltages (VA High and VA Low) are known because the resistors of the reference circuit 276 are known. The first reference potential (Vs) falls out of all calculations because it is common to both the sense circuit 104 and the reference circuit 276.

$$m = \frac{DA_{High} - DA_{Low}}{V_{AHigh} - V_{ALow}}, \qquad \text{eq 1}$$

where $DA_{High}$ is the digital value corresponding to $VA_{High}$, $VA_{High}$ corresponds to the output of the amplifier 272 when the input of the amplifier 272 is receiving the difference between the third and fifth reference potentials (V5–V3), $DA_{Low}$, is the digital value corresponding to $VA_{Low}$, $VA_{Low}$ corresponds to the output of the amplifier 272 when the input of the amplifier 272 is receiving the difference between the fourth and fifth reference potentials (V5–V4), and m is the slope of the line. $VA_{High}$ and $VA_{Low}$ are known and fixed values because the resistors of the reference circuit 276 are known and the first reference potential (Vs) is fixed.

The correction module 414 determines the slope (m) based on the stored $DA_{High}$ and $DA_{High}$ and the known values of $VA_{High}$ and $VA_{Low}$ using equation 1. m is one of the correction values.

The equation for a line using two points is given in equation 2 (eq 2) below.

$$y = mx + b \qquad \text{eq 2}$$

Rearranging equation 2 to solve for the y-intercept (b) yields equation 3 (eq 3) below.

$$b = y - mx \qquad \text{eq 3}$$

Equations 4a and 4b below substitutes the digital values of the reference voltages into the equation 3 that solves for b (the y-intercept).

$$b = D_{High} - mV_{High} \qquad \text{eq 4a}$$

$$b = D_{Low} - mV_{Low} \qquad \text{eq 4b}$$

where b is the y-intercept, m is the slope, $DA_{High}$ is the digital value corresponding to $VA_{High}$, $VA_{High}$ corresponds to the output of the amplifier 272 when the input of the amplifier 272 is receiving the difference between the third and fifth reference potentials (V5–V3) and is a known fixed value, $DA_{Low}$ is the digital value corresponding to $VA_{Low}$, and $VA_{Low}$ corresponds to the output of the amplifier 272 when the input of the amplifier 272 is receiving the difference between the fourth and fifth reference potentials (V5–V4) and is a known fixed value.

The correction module 414 determines the y intercept (b) based on the stored $DA_{High}$ and $DA_{High}$ and the known values of $VA_{High}$ and $VA_{Low}$ using equation 4a or equation 4b. b is also one of the correction values.

Thus, characteristics (m and b) of the linear equation that describes the relationship between outputs of the amplifier 272 and digital values is known.

Equation 5 (eq 5) below rearranges equation 2 to solve for x, the true input voltage to the control module 112.

$$x = \frac{y - b}{m} \qquad \text{eq 5}$$

Substituting the parameters of equation 5 gives equation 6 (eq 6) below.

$$V_{sensor} = \frac{D_A - b}{m}, \qquad \text{eq 6}$$

where $D_A$ is the digital value corresponding to a sample of the output of the amplifier 272 when the input of the amplifier is receiving the difference between the first and second reference potentials (V1–V2), b is the y intercept of the line, as determined above, and m is the slope of the line, as determined above, and $V_{sensor}$ is a difference between the first and second reference potentials (V1–V2). Using equation 6, the correcting module 406 corrects digital values corresponding to samples of the output of the amplifier 272 when the input of the amplifier is receiving the difference between the first and second reference potentials (V1–V2), respectively, to produce corrected digital values (Corrected DA).

The pressure module 416 converts the corrected digital values into pressures, respectively. The pressure module 416 may convert the corrected digital values into respective pressures using one of an equation and a lookup table that relates corrected digital values into pressures. For example, the pressure module 416 may determine pressure based on a corrected digital value using equation 7 (eq 7) below.

$$P = k * V_{sensor} \qquad \text{eq 7}$$

where P is the second pressure at the second pressure sensor 40, k is a fixed predetermined value (e.g., in kPa/mV), and $V_{sensor}$ is the difference between the first and second reference potentials (V1–V2) determined as described above.

While the example of three voltage dividers providing two reference potential differences (V3–V5 and V4–V5) and a linear equation is provided, the measure circuit 108 may include one or more additional voltage dividers to provide one or more additional reference potential differences and another form of equation (e.g., polynomial, quadratic, etc.) may be used to correct digital values.

In various implementations, the control module 112 may include a pump control module 420 that controls a rotational speed of the pump 32 based on the second pressure determined by the pressure module 416. For example, the pump control module 420 may adjust the rotational speed of an electric motor of the pump 32 in closed loop to adjust the second pressure toward or to the second target pressure. The pump control module 420 may, for example, increase the rotational speed of the electric motor when the second pressure is less than the second target pressure and decrease the rotational speed of the electric motor when the pressure is greater than the second target pressure. The second target pressure may be fixed or variable.

The pump control module 420 may adjust the rotational speed of the electric motor of the pump 32 by adjusting power application to the electric motor of the pump 32. For example, the pump control module 420 may increase one or more electrical parameters (e.g., voltage, current, ON period of duty cycle) applied to the electric motor to increase the rotational speed and vice versa.

Figure 7A:
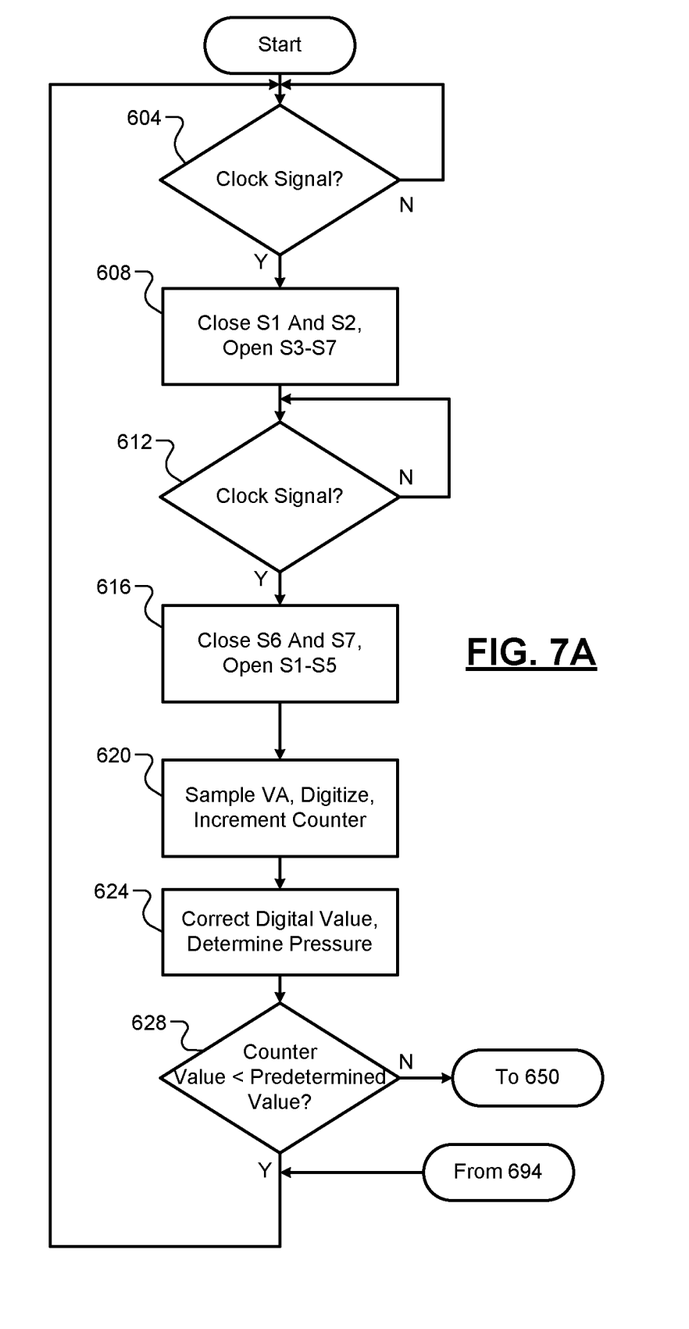
FIGS. 7A-7B include a flowchart depicting an example method of determining pressure.
Figure 7B:
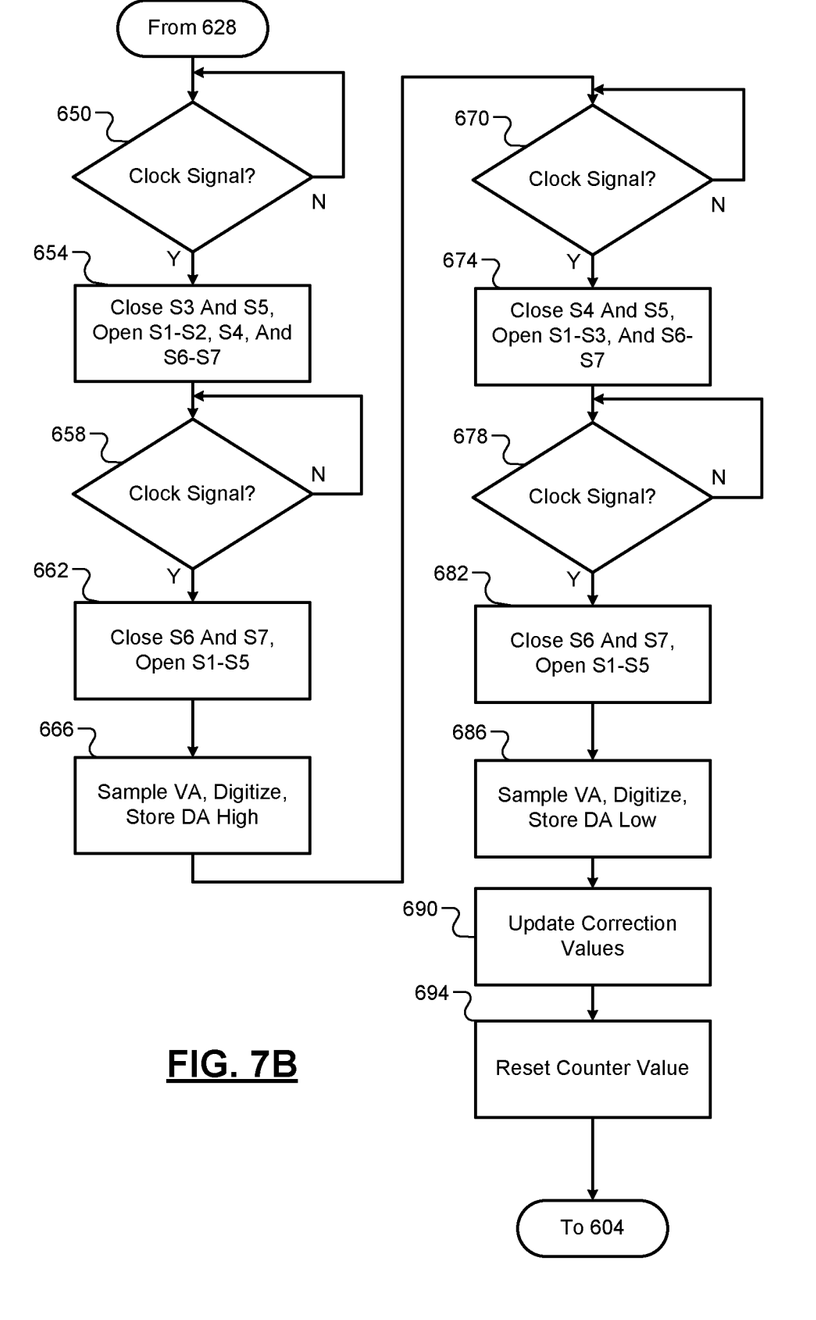

FIGS. 7A and 7B include a flowchart depicting an example method of measuring the second pressure using the second pressure sensor 40. Control may begin with 604 where the A/D module 408 determines whether a first clock signal has been generated. If 604 is true, control continues with 608. If 604 is false, control may remain at 604.

At 608, the switch module 402 closes the first and second switches 224 and 232. The switch module 402 also opens the third, fourth, fifth, sixth, and seventh switches 252, 256, 260, 264, and 268. The potential difference between the first and second reference potentials V1 and V2 is then applied to the capacitor 244. At 612, the switch module 402 determines whether a second clock signal has been generated. If 612 is true, control continues with 616. If 612 is false, control remains at 612.

At 616, the switch module 402 closes the sixth and seventh switches 264 and 268. The switch module 402 also opens the first, second, third, fourth, and fifth switches 224, 232, 252, 256, and 260. The capacitor 244 then inputs the potential difference between the first and second reference potentials V1 and V2 to the amplifier 272.

At 620, the A/D module 408 samples the output of the amplifier 272 (VA) and digitizes the sample value to produce a corresponding digital value. In other words, the A/D module 408 converts the sample value into the corresponding digital value using A/D conversion. The correction module 414 also increments a counter value at 620. At 624, the correcting module 406 corrects the digital value based on the correction values, as described above, thereby producing a corrected digital value. The pressure module 416 determines the pressure based on the corrected digital value and the predetermined value, as described above.

At 628, the correction module 414 determines whether the counter value is less than a predetermined value. If 628 is false, control transfers to 650 (FIG. 7B) to update the correction values. In this manner, the correction module 414 determines the correction values each predetermined number (i.e., predetermined value) of measurements of the sense circuit 104. The predetermined number/value is an integer greater than zero and may be greater than one, such as 5, 10, 100, etc. If 628 is true, control returns to 604 for a next measurement from the sense circuit 104.

At 650, the switch module 402 determines whether a third clock signal has been generated. If 650 is true, control continues with 654. If 650 is false, control remains at 650. The switch module 402 closes the third and fifth switches 252 and 260 at 654. The switch module 402 also opens the first, second, fourth, sixth, and seventh switches 224, 232, 256, 264, and 268 at 654. The potential difference between the third and fifth reference potentials V3 and V5 is then applied to the capacitor 244. At 658, the switch module 402 determines whether a fourth clock signal has been generated. If 658 is true, control continues with 662. If 658 is false, control remains at 658.

At 662, the switch module 402 closes the sixth and seventh switches 264 and 268. The switch module 402 also opens the first, second, third, fourth, and fifth switches 224, 232, 252, 256, and 260. The capacitor 244 then inputs the potential difference between the third and fifth reference potentials V3 and V5 to the amplifier 272. At 666, the A/D module 408 samples the output of the amplifier 272 (VA) and digitizes the sample value to produce a corresponding digital value at 666. In other words, the A/D module 408 converts the sample value into the corresponding digital value using A/D conversion. The storing module 412 stores the digital value (DA High).

At 670, the switch module 402 determines whether a fifth clock signal has been generated. If 670 is true, control continues with 674. If 670 is false, control remains at 670. The switch module 402 closes the fourth and fifth switches 256 and 260 at 674. The switch module 402 also opens the first, second, third, sixth, and seventh switches 224, 232, 252, 264, and 268 at 604. The potential difference between the fourth and fifth reference potentials V4 and V5 is then applied to the capacitor 244.

At 678, the switch module 402 determines whether a sixth clock signal has been generated. If 678 is true, control continues with 682. If 678 is false, control remains at 678. At 682, the switch module 402 closes the sixth and seventh switches 264 and 268. The switch module 402 also opens the first, second, third, fourth, and fifth switches 224, 232, 252, 256, and 260. The capacitor 244 then inputs the potential difference between the fourth and fifth reference potentials V4 and V5 to the amplifier 272.

At 686, the A/D module 408 samples the output of the amplifier 272 (VA) and digitizes the sample value to produce a corresponding digital value at 686. In other words, the A/D module 408 converts the adjusted value into the corresponding digital value using A/D conversion. The storing module 412 stores the digital value (DA Low).

At 690, the correction module 414 determines (updates) the correction values based on the stored digital values (DA High and DA Low from 666 and 686) and the known values of the reference potentials, as described above. The correction values will be used to adjust digital values of the output of the amplifier 272 representing the output of the sense circuit 104. The correction module 414 resets the counter value, such as to zero, at 694. Control returns to 604 to continue outputting digital values corresponding to measurements of the sense circuit 104.

Figure 8:
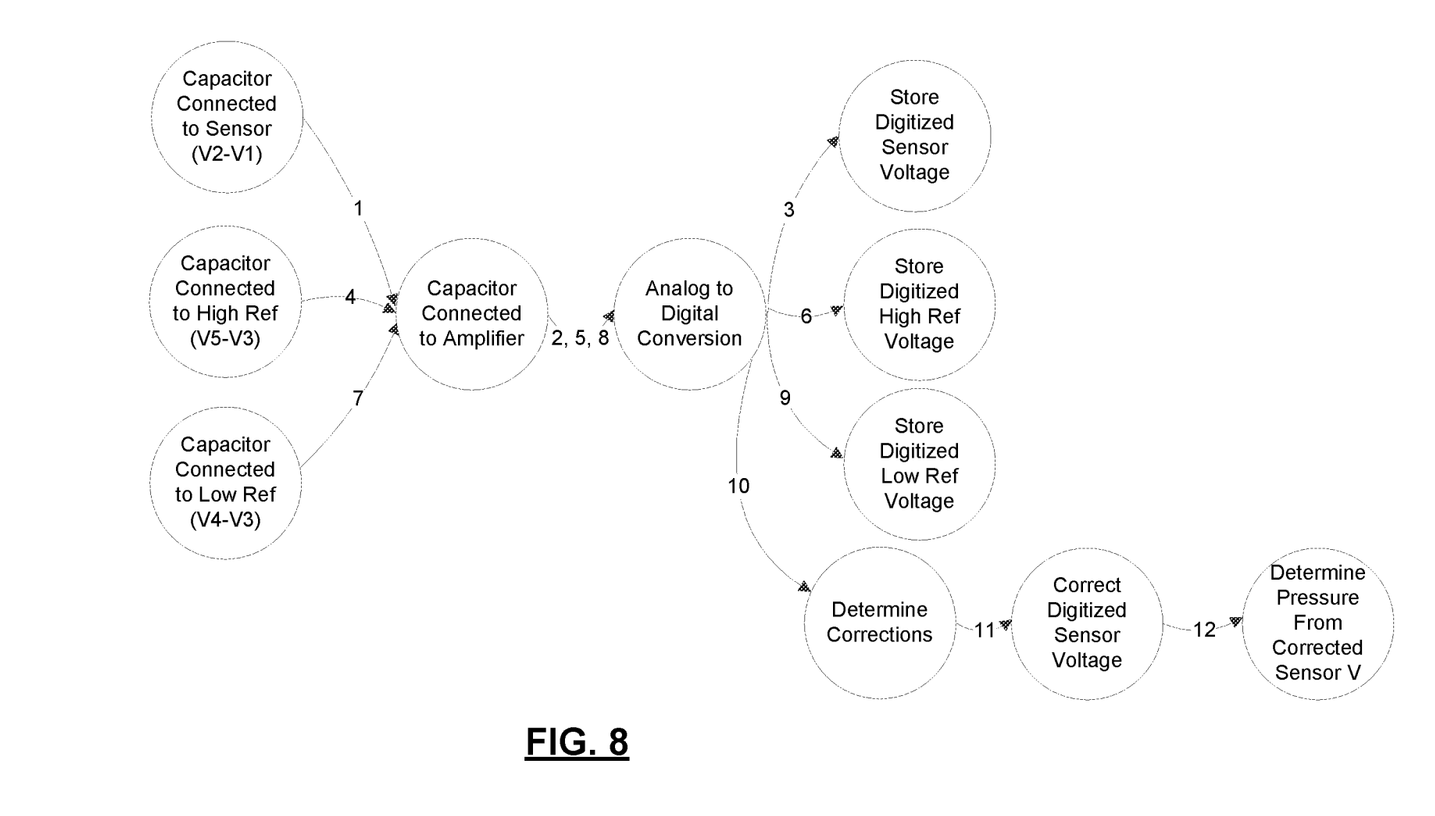
FIG. 8 includes an example state diagram illustrating an example sequence of determining pressure In the drawings, reference numbers may be reused to identify similar and/or identical elements.

FIG. 8 includes an example state diagram illustrating an example sequence of determining pressure, as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A pressure sensing system of an exhaust aftertreatment system of a vehicle, comprising:
   a pressure sensor including:
      a housing;
      a substrate that is fixed within the housing, that includes a first side that is in contact with a fluid of the exhaust aftertreatment system, and that flexes based on a pressure of the fluid at the first side;
      a first voltage divider that is connected between a first reference potential and a ground potential and that varies a first potential based on flexing of the substrate; and
      a second voltage divider connected in parallel with the first voltage divider between the first reference potential and the ground potential and that varies a second potential based on flexing of the substrate;
   a pressure control module that includes:
      a measure circuit that includes:
         third, fourth, and fifth voltage dividers that are connected between the first reference potential and the ground potential and that output third, fourth, and fifth potentials, respectively;
         a first switch connected to selectively connect and disconnect the first potential to and from a first end of a capacitor;
         a second switch connected to selectively connect and disconnect the second potential to and from a second end of the capacitor;
         a third switch connected to selectively connect and disconnect the third potential to and from the first end of the capacitor;
         a fourth switch connected to selectively connect and disconnect the fourth potential to and from the first end of the capacitor;
         a fifth switch connected to selectively connect and disconnect the fifth potential to and from the second end of the capacitor;
         the capacitor;
         a sixth switch connected to selectively connect and disconnect the first end of the capacitor to an input of an amplifier;
         the amplifier; and
         a seventh switch connected to selectively connect and disconnect the second end of the ground potential; and
      a control module that is configured to:
         selectively switch the first, second, third, fourth, fifth, sixth, and seventh switches;

sample an output of the amplifier; and
convert samples of the output of the amplifier into corresponding digital values.

2. The pressure sensing system of claim 1 wherein:
resistances of at least one of first and second resistors of the first voltage divider vary based on flexing of the substrate; and
resistances of at least one of third and fourth resistors of the second voltage divider vary based on flexing of the substrate.

3. The pressure sensing system of claim 1 wherein:
the first voltage divider increases the first potential as flexing of the substrate increases; and
the second voltage divider decreases the second potential as flexing of the substrate increases.

4. The pressure sensing system of claim 1 wherein:
the first voltage divider increases the first potential as flexing of the substrate increases; and
the second voltage divider increases the second potential as flexing of the substrate increases.

5. The pressure sensing system of claim 1 wherein:
the first voltage divider includes:
a first resistor having a first resistance; and
a second resistor having a second resistance; and
the second voltage divider includes:
a third resistor having a third resistance; and
a fourth resistor having a fourth resistance.

6. The pressure sensing system of claim 5 wherein the first resistance is equal to the second resistance and the third resistance is equal to the fourth resistance.

7. The pressure sensing system of claim 6 wherein the second resistance is equal to the third resistance.

8. The pressure sensing system of claim 1 wherein resistors of the first, second, third, fourth, and fifth voltage dividers have temperature coefficients of 50 ppm/degree Celsius or better.

9. The pressure sensing system of claim 1 wherein resistors of the first, second, third, fourth, and fifth voltage dividers have tolerances of 0.1% or better.

10. The pressure sensing system of claim 1 wherein the amplifier includes a slew rate of at least 2V/microsecond.

11. The pressure sensing system of claim 1 wherein the control module is configured to:
at a first time:
close the first and second switches thereby connecting the first and second potentials with the first and second ends of the capacitor; and
open the third, fourth, fifth, sixth, and seventh switches;
at a second time that is after the first time:
close the sixth and seventh switches thereby connecting the capacitor with the input of the amplifier; and
open the first, second, third, fourth, and fifth switches.

12. The pressure sensing system of claim 11 wherein the control module is further configured to:
at a third time:
close the third and fifth switches thereby connecting the third and fifth potentials with the first and second ends of the capacitor; and
open the first, second, fourth, sixth, and seventh switches;
at a fourth time that is after the third time:
close the sixth and seventh switches thereby connecting the capacitor with the input of the amplifier; and
open the first, second, third, fourth, and fifth switches.

13. The pressure sensing system of claim 12 wherein the control module is further configured to:
at a fifth time:
close the fourth and fifth switches thereby connecting the fourth and fifth potentials with the first and second ends of the capacitor; and
open the first, second, third, sixth, and seventh switches;
at a sixth time that is after the fifth time:
close the sixth and seventh switches thereby connecting the capacitor with the input of the amplifier; and
open the first, second, third, fourth, and fifth switches.

14. The pressure sensing system of claim 13 wherein the control module is further configured to:
while the sixth and seventh switches are closed after the second time, sample the output of the amplifier to produce a first sample value;
while the sixth and seventh switches are closed after the fourth time, sample the output of the amplifier to produce a second sample value;
while the sixth and seventh switches are closed after the sixth time, sample the output of the amplifier to produce a third sample value;
convert the first, second, and third sample values into first, second, and third digital values, respectively, using analog to digital (A/D) conversion;
determine correction values based on the second and third digital values;
determine a corrected digital value based on the first digital value and the correction values; and
determine a pressure based on the corrected digital value.

15. The pressure sensing system of claim 14 wherein the control module is configured to determine the pressure based on the corrected digital value and a predetermined value.

16. The pressure sensing system of claim 15 wherein the control module is configured to set the pressure based on the corrected digital value multiplied by the predetermined value.

17. The pressure sensing system of claim 14 wherein the control module is further configured to, based on the pressure, selectively adjust a speed of a pump that pumps the fluid.

18. A pressure sensing system of an exhaust aftertreatment system of vehicle, comprising:
a pressure sensor including:
a housing;
a substrate that is fixed within the housing, that includes a first side that is in contact with a fluid of the exhaust aftertreatment system, and that flexes based on a pressure of the fluid at the first side;
a sense circuit that is implemented one of on and within the substrate and that includes:
a first resistor and a second resistor that:
are connected in series between a first reference potential and a ground potential; and
vary a first potential at a first node between the first resistor and the second resistor based on flexing of the substrate;
a third resistor and a fourth resistor that:
are connected in series between the first reference potential and the ground potential in parallel with the first and second resistors; and
vary a second potential at a second node between the third resistor and the fourth resistor based on flexing of the substrate; and
a pressure control module that includes:
a measure circuit that includes:
a fifth resistor, a sixth resistor, a seventh resistor, and an eighth resistors that are connected in series between the first reference potential and the ground potential and that:
output a third potential at a third node between the fifth resistor and the sixth resistor;
output a fourth potential at a fourth node between the sixth resistor and the seventh resistor; and
output a fifth potential at a fifth node between the seventh resistor and the eighth resistor;
a first switch connected to selectively connect and disconnect the first potential to and from a first end of a capacitor;
a second switch connected to selectively connect and disconnect the second potential to and from a second end of the capacitor;
a third switch connected to selectively connect and disconnect the third potential to and from the first end of the capacitor;
a fourth switch connected to selectively connect and disconnect the fourth potential to and from the first end of the capacitor;
a fifth switch connected to selectively connect and disconnect the fifth potential to and from the second end of the capacitor;
the capacitor;
a sixth switch connected to selectively connect and disconnect the first end of the capacitor to an input of an amplifier;
the amplifier; and
a seventh switch connected to selectively connect and disconnect the second end of the ground potential; and
a control module that is configured to:
selectively switch the first switch, the second switch, the third switch, the fourth switch, the fifth switch, the sixth switch, and the seventh switch;
sample an output of the amplifier; and
convert samples of the output of the amplifier into corresponding digital values.

19. The pressure sensing system of claim 18 wherein the control module is configured to:
at a first time:
close the first and second switches thereby connecting the first and second potentials with the first and second ends of the capacitor; and
open the third, fourth, fifth, sixth, and seventh switches;
at a second time that is after the first time:
close the sixth and seventh switches thereby connecting the capacitor with the input of the amplifier; and
open the first, second, third, fourth, and fifth switches;
at a third time:
close the third and fifth switches thereby connecting the third and fifth potentials with the first and second ends of the capacitor; and
open the first, second, fourth, sixth, and seventh switches;
at a fourth time that is after the third time:
close the sixth and seventh switches thereby connecting the capacitor with the input of the amplifier; and
open the first, second, third, fourth, and fifth switches;
at a fifth time:
close the fourth and fifth switches thereby connecting the fourth and fifth potentials with the first and second ends of the capacitor; and
open the first, second, third, sixth, and seventh switches;
at a sixth time that is after the fifth time:
close the sixth and seventh switches thereby connecting the capacitor with the input of the amplifier; and
open the first, second, third, fourth, and fifth switches;
while the sixth and seventh switches are closed after the second time, sample the output of the amplifier to produce a first sample value;
while the sixth and seventh switches are closed after the fourth time, sample the output of the amplifier to produce a second sample value;
while the sixth and seventh switches are closed after the sixth time, sample the output of the amplifier to produce a third sample value;
convert the first, second, and third sample values into first, second, and third digital values using analog to digital (A/D) conversion;
determine correction values based on the second and third digital values;
determine a corrected digital value based on the first digital value and the correction values; and
determine a pressure based on the corrected digital value.

20. The pressure sensing system of claim 19 wherein the control module is further configured to, based on the pressure, selectively adjust a speed of a pump that pumps the fluid.

* * * * *